United States Patent

Nussdorfer et al.

[11] Patent Number: 5,980,796
[45] Date of Patent: Nov. 9, 1999

[54] PROCESS FOR PRODUCING MOLDED PARTS BY POLYMERIZATION OF LACTAMS IN MOLDS

[75] Inventors: Bernd-Klaus Nussdorfer, Geldern; Albrecht Peiffer, Meerbusch; Klaus Titzschkau, Wüstenrot, all of Germany

[73] Assignee: G. Schwartz GmbH & Co. KG, Xanten, Germany

[21] Appl. No.: 08/793,203

[22] PCT Filed: Jul. 26, 1995

[86] PCT No.: PCT/EP95/02955

§ 371 Date: Mar. 28, 1997

§ 102(e) Date: Mar. 28, 1997

[87] PCT Pub. No.: WO96/04124

PCT Pub. Date: Feb. 15, 1996

[30] Foreign Application Priority Data

Aug. 1, 1994 [DE] Germany ............................... 44 27 206
Sep. 28, 1994 [DE] Germany ............................... 44 34 657

[51] Int. Cl.$^6$ ............................. B29C 70/12; B29C 70/42
[52] U.S. Cl. ............................. 264/85; 264/102; 264/257; 264/258; 264/310; 264/DIG. 56; 528/323
[58] Field of Search ............................... 264/85, 102, 257, 264/258, 310, DIG. 56; 528/323

[56] References Cited

U.S. PATENT DOCUMENTS

| | | | |
|---|---|---|---|
| 3,349,634 | 10/1967 | Terhune et al. | |
| 3,752,623 | 8/1973 | Sinn et al. | 425/206 |
| 3,780,157 | 12/1973 | Hechlhammer et al. | 264/310 |
| 4,182,843 | 1/1980 | Haupt et al. | 264/102 X |
| 4,508,675 | 4/1985 | Salatiello et al. | 264/310 |

FOREIGN PATENT DOCUMENTS

| | | |
|---|---|---|
| 1221216 | 5/1987 | Canada . |
| 134992 | 3/1985 | European Pat. Off. . |
| 247708 | 12/1987 | European Pat. Off. . |
| 272635 | 6/1988 | European Pat. Off. . |
| 539182 | 4/1993 | European Pat. Off. . |
| 547330 | 6/1993 | European Pat. Off. . |
| 1066012 | 7/1958 | Germany . |
| 1174982 | 8/1962 | Germany . |
| 1214865 | 6/1964 | Germany . |
| 1910175 | 9/1970 | Germany . |
| 2050572 | 5/1971 | Germany . |
| 2026906 | 12/1971 | Germany . |
| 2637683 | 2/1978 | Germany . |
| 2817778 | 11/1978 | Germany . |
| 3325554 | 1/1985 | Germany . |
| 8400930 | 10/1985 | Netherlands . |
| 1249217 | 10/1971 | United Kingdom . |
| 2208364 | 3/1989 | United Kingdom . |

*Primary Examiner*—Leo B. Tentoni
*Attorney, Agent, or Firm*—Robert W. Becker & Associates

[57] ABSTRACT

A method for manufacturing a sheet molded part by polymerization of lactams in a sheet mold includes the steps of placing a fiber composite material into a sheet mold having large plane surfaces and fixedly positioning the fiber composite material in the sheet mold. Subsequently, the lactams are introduced into the sheet mold and the lactams are polymerized.

26 Claims, 2 Drawing Sheets

PROCESS FOR PRODUCING MOLDED PARTS BY POLYMERIZATION OF LACTAMS IN MOLDS

BACKGROUND OF THE INVENTION

The invention relates to a process for manufacturing molded parts by polymerization of lactams in molds with addition of fiber composite material. The invention relates furthermore to novel molded parts produced according to the inventive process.

The technical manufacture of molded parts from lactams, preferably by activated alkaline quick polymerization or block polymerization has been in use for approximately 30 years. The term molded parts in the context of the present invention refers to elements that can be produced with the known casting and polymerization techniques and which include semi-finished products, shaped elements etc.

In the field of machine and apparatus construction, for example, it has been attempted for many years to replace sheet metal with other materials that have technical and/or financial advantages in their manufacture and/or their application. As alternative materials, among others, plastic materials have found acceptance which have versatile properties and can be matched very precisely to respective requirements. However, to date no plastic material has been found with which can replace metals completely with respect to strength, stability, hardness, stiffness, tenacity, temperature resistance, behavior in fire etc. Insofar as individual plastic materials have at least partially reached the technological properties of metal or in some cases even surpass them, their use is, in general, not comparable to the use of metals with respect to economic considerations. It is thus still necessary to select for each application the respective optimal replacement plastic material from a great palette of possible variants in order to comply optimally with the respective profile of specifications.

Fields for the use of sheet plastic molded parts are the automobile industry and transportation. In these fields sheet molded parts are used which in the past have been made from sheet metal. In the recent past, these molded parts have been replaced in particular by thermosetting materials, whereby especially unsaturated polyester resins (UP resins), polyurethanes (PU resins), and epoxide resins (EP resins) have been popular. For mechanically minimally loaded parts, thermoplastic materials have been used more and more whereby mostly the mass-produced plastics polypropylene (PP), polycarbonate (PC), acrylonitrile butadiene styrene (ABS), and different mixtures are being used.

The plurality of employed plastic materials, especially in the automobile industry, has been considered more and more as a disadvantage in comparison to the metallic materials because in the recent past a need for recycling and reuse of the discarded old apparatus has developed. While the metal recycling problem has been solved for years substantially by scrap metal treatment, plastic recycling is still in the start-up phase. It has been shown already that a sorting according to plastic types is very complicated and expensive. Instead, it seams to be more useful to employ from the beginning only a small number of plastic materials. These plastic materials should then be used for the respective applications in large quantities, in the automobile industry, for example, for bumpers, side panels, fenders, roofs, the underbody groups, engine compartment hood etc. In this context, it is desirable to provide only one plastic material for a large number of applications.

Important parameters for recycling of plastics is the required energy expenditure and the reworking degree of the remaining plastic to new plastic parts. Conventionally, the plastic parts are comminuted and foreign materials are cleaned off. The resulting raw material is, in general, available in granular form. When a thermoplastic material is provided it can be used completely in injection molding machines to produce new parts. However, thermosetting plastics do not melt under comparable conditions and can only be used partially as a filler material when new thermosetting parts are produced. Thus, the thermoplastic materials due to their complete recyclability have become more and more important in comparison to thermosetting materials so that more emphasis has been placed on the search for suitable thermoplastic replacement materials.

A known thermoplastic material with an especially balanced property spectrum is polyamide which is already being used for manufacturing high quality technical parts. Polyamides can be affected with respect to their technological properties so that they are interesting as a replacement for metals with respect to technical and economic considerations. However, thermoplastics could not be used in the past for producing sheet molded parts, i.e., parts that have thin walls relative to their surface area. Especially for supporting parts, which must withstand strong mechanical forces without breaking, thermosetting elements in addition to sheet metal still dominate.

Molded parts of polyamide can be produced, for example, by polymerization of lactams. The technical manufacture of molded parts from lactams, preferably by activated alkaline quick polymerization or block polymerization, has been used for approximately 30 years. The term sheet molded parts in the context of the present invention includes conventionally produced molded parts made of foil, sheet metal, or other large surface area materials which conventionally have a large surface area and a relative minimal thickness.

In general, molded parts of lactams are produced by polymerization of lactams in casting molds and, in comparison to conventional plastic elements, for example, also comprised of polyamide, are in general harder, stiffer, and more wear resistant. This is primarily a result of their higher crystallinity. By predetermining the method parameters such as temperature, residence time, etc., as well as by selecting the additives to be used and the post-treatment, the respective technological properties of the molded parts can be affected. Most of these aforementioned conditions, however, can only be maintained with very great economical and technical expenditure. The high crystallinity has primarily the effect that the shaped parts produced from lactams also have a high brittleness. Thus, the molded parts produced from lactams in conventional methods can be destroyed in an explosion-like fracture by suddenly occurring overloads due to a so-called cold flow. This can result in considerable damage in connection with constructive parts relevant to safety aspects.

Even though in the prior art the use of fiber glass-reinforced thermosetting resins cured from monomers in molds, these prior art methods cannot be simply transferred by a person skilled in the art. Thermosetting plastics, i.e., fiber glass plastics in the conventional sense, are produced by radical-induced polymerization. The manufacture of molded parts with polymerization of lactams relates to thermoplastic materials produced by anionic polymerization. This process concerns parameters that are of no consequence in radical polymerization. Thus, the transfer of methodological knowledge of the thermosetting plastic manufacture cannot be simply applied to the thermoplastic manufacture by lactam polymerization since the anionic polymerization is subject to its own rules. The rules for thermosetting plastic manufacture cannot be transferred.

Special problems for the anionic polymerization of lactams result, for example, from method parameters in regard to moisture and the sensitivity of the lactams to polar substances. For example, it is not possible to embed conventional fiber glass plastics into the lactams, but they must fulfill certain criteria in regard to the method parameters.

Methods for manufacturing molded parts by polymerization of lactams are, for example, known from DE 1 174 982 A1 and DE 1 910 175 A1. The first mentioned method discloses the manufacture of cast polyamide shaped bodies which are produced by rotational casting whereby the rotational forces may not surpass the gravitational forces. Even though the general possibility of introducing filler materials is disclosed, it is not recognized here with which measures defined technological properties can be produced. DE 1 910 175 A1 discloses also a method for producing polyamide cast parts whereby mats are introduced for increasing the stiffness of thin-walled molded parts. There is no disclosure in regard to the directed use of fibers or the use of a certain type of fibers.

In DE 2 050 572 A1, DE 1 214 865 A1, and DE 1 066 012 A1, rotational and spinning cast methods are disclosed which describe method details but no relation to the manufacture of molded parts fiber-reinforced in a directed manner.

It is an object of the present invention to improve a method for manufacturing molded parts by polymerization of lactams in molds such that the resistance of the inventively produced molded parts with respect to suddenly occurring load peaks is increased and the reproducibility of the defined technological properties of the inventively produced molded parts is improved.

SUMMARY OF THE INVENTION

The technical solution to this object is a method for manufacturing molded parts by polymerization of lactams in molds in which the fiber material is introduced into the mold part for embedding in the molded part before the polymerization step takes place and is stationarily positioned relative to the mold.

The inventive method for manufacturing a sheet molded part by polymerization of lactams in a mold is characterized by the steps of:

placing a fiber composite material into a sheet mold having large plane surfaces;

fixedly positioning the fiber composite material in the sheet mold;

introducing the lactams into the sheet mold;

polymerizing the lactams.

The method further comprises, before the step of introducing, the step of heating the sheet mold to a temperature of 120° C. to 190° C.

The method further comprises, before the step of introducing, the step of heating the sheet mold to a temperature of 145° C. to 180° C.

The method may comprise, before the step of placing, the step of producing the fiber composite material from fiber glass. The surface of the fiber glass of the fiber composite material is preferably free of ionic substances.

The method may further comprise the step of selecting a proportion of fiber glass in the sheet molded part to be 10–70%.

The method may further comprise, before the step of placing, the step of producing the fiber composite material from plastic fibers.

The method also comprises, before the step of placing, the step of producing the fiber composite material as a needled felt or needled nonwoven.

The method may include, before the step of placing, the step of producing the fiber composite material as rovings.

The method may include, before the step of placing, the step of producing the fiber composite material as a woven material (fabric).

The method may also comprise, before the step of placing, the step of producing the fiber composite material as mats.

The method may include, before the step of introducing, the steps of adding additives to the lactams and melting the lactams and additives for forming a melt.

In the step of melting, the lactams and the additives are heated to a temperature of 110° C. to 140° C., preferably to a temperature of 116° C. to 125° C.

The step of introducing includes pouring the melt into the sheet mold and the method may further comprise, after the step of pouring, the step of closing the sheet mold and the step of evacuating the sheet mold.

The step of introducing includes pouring the melt in batches into the sheet mold.

The method may further include, after the step of fixedly positioning, the step of heating the sheet mold.

The method may also comprise, after the step of fixedly positioning, the steps of closing the sheet mold and flowing nitrogen through the closed sheet mold.

The method may comprise, before the step of introducing, the step of closing the sheet mold, wherein the step of introducing includes melting the lactams and injecting the lactams into the closed sheet mold.

The method may comprise the step of pressurizing the closed sheet mold.

The method may further comprise, after the step of introducing, the step of rotating the sheet mold.

In the step of rotating the sheet mold is rotated at a speed of 30 to 250 rpm.

In the step of rotating the sheet mold may be rotated at a speed of up to 2000 rpm.

The method may include, before the step of introducing, the steps of adding additives to the lactams and melting the lactams and additives for forming a melt, wherein the step of introducing includes pouring the melt into the sheet mold at a center of rotation of the sheet mold.

The invention also relates to a sheet molded part, comprised of polymerized lactams and a fiber composite material embedded in the polymerized lactams, produced in accordance with the inventive method.

Preferably, fiber composite material is fixedly arranged at predetermined locations before being embedded.

According to the inventive method it is thus made possible with the directed introduction of fiber composite material to improve the reproducibility of the technological properties of the molded part material. These include, for example, tensile strength, elastic modulus, impact resistance etc. The term fiber composite material in the context of the invention includes rovings, fabrics, mats, nonwovens and felt, i.e., according to advantageous embodiments of the invention, needled nonwovens and needled felt, fabrics, rovings, roving fabric, and mats, preferably of fiber glass, respectively, plastic fibers.

An important aspect is the consideration of compatibility of the material (matrix) with the fabric, from which the technological properties result. For example, it is important that the fibers are free of inhibiting compounds.

The fiber composite material, according to a suggestion of the invention, is stationarily fixed in the mold so that the geometric location of the fiber composite material within the workpiece is ensured. In an advantageous manner, the mold with the fabric introduced is heated to a temperature of 120° C. to 190° C., preferably 145° C. to 180° C. According to a suggestion of the invention, the lactams are poured into the mold after placing the fiber composite material into the mold. It is advantageous in this context to melt the lactams with the required additives before casting into the mold. Advantageously, the temperature is adjusted to 110° C. to 140° C., preferably 116° C. to 125° C.

According to an advantageous embodiment of the invention, the mold is closed after introduction of the lactams and evacuated. In addition, or alternatively, according to another suggestion of the invention, the mold during and/or after introduction of the lactams is rotated. Advantageously, rotational speeds of 30 to 250 rpm are adjusted. At these speeds the mold can also be rotated biaxially which is advantageous for the manufacture of hollow bodies. This method allows for the batch-wise pouring of lactams so that in sequence individual casts as a function of the viscosity of the melt can be performed. This method also allows for the subsequent introduction of fiber composite material insofar as the required method parameters with respect to the lactam melt are observed so that complete polymerization cannot occur.

According to a further advantageous suggestion of the invention, the rotational speeds are adjusted to between 100 and 2000 rpm. The casting into the rotating mold is carried out at the center of rotation. All named methods make sure that air inclusions in the manufactured molded parts are prevented and that a good connection between the casting material and the fiber composite material is achieved.

According to an advantageous embodiment of the invention glass is to be used in an amount as large as possible. This results in an increase especially of the stability values. It is especially important in this context that the polymerized polyamide adheres as tightly as possible to the surface of the glass, that air inclusions in the finished part are at a minimum, and that especially the polymerization is substantially complete with a remaining lactam contents of maximum 2%.

According to a suggestion of the invention fiber glass fabrics are primarily used. They have the advantage of minimum volume so that a lesser amount of air is introduced into the molds. Furthermore, by layering a higher glass proportion can be achieved. The fabrics can also be placed with respect to the required loading direction in different fiber orientation in order to provide a composite that can satisfy different static and dynamic loads. The use of fiber glass fabrics also allows for the manufacture of thin-walled elements.

According to a suggestion of the invention the glass fiber fabrics are introduced into the heated mold and the mold is then heated further. With this measure the moisture contained within the fabric can be removed. For this purpose, it is also possible to flow nitrogen through the introduced fabric in the closed mold. It is also possible to evacuate the closed mold. Primarily, with these measures moisture is avoided which would impede or even inhibit the polymerization of the lactams so that a remaining lactam proportion of more than 2% would result.

According to a further suggestion of the invention, the fiber glass material is used which has no ionic substances at its surface. It is furthermore suggested to perform the evacuation of the mold such that air inclusions within the finished part are prevented. In this context, it is possible, on the one hand, to generate a vacuum after introduction of the lactams and the closing of the mold. It is also possible to inject the lactams into the evacuated mold.

According to another suggestion of the invention, the mold is pressurized during polymerization. For this purpose, the mold can be introduced into a press. With this measures, it is possible to produce especially tension-reduced shaped parts. According to a further suggestion of the invention, additives may be added to the lactams in order to affect the desired technological properties. Conventionally, certain reactive prepolymers are used with which in the highly crystalline cast polyamide the amorphous contents can be increased in a directed manner so that the brittleness is reduced and the tenacity strength is increased. According to a further suggestion of the invention, the additives are selected under the aspect of making the material recyclable as a thermoplastic material. Of course, no additives should be used which would impede anionic polymerization.

With the inventive method it is possible to produce sheet molded parts which, while allowing an economical manufacture, have substantially the technological properties of sheet metal molded parts. Furthermore, the molded parts produced according to the inventive method also have technological properties of molded parts of thermosetting plastics, but are recyclable more simply and especially more completely.

With the inventive method it is also possible to produce molded parts with reproducible technological properties whereby, in general, the resistance in regard to suddenly occurring load peaks is increased. The mechanical properties can, for example, be affected by the type of fiber composite material, the way of positioning with respect to the number of layers, the fiber orientation etc.

A molded part produced according to the inventive method is novel with respect to its construction and its technological properties. Especially surprising is the selectability and reproducibility of the technological properties.

BRIEF DESCRIPTION OF THE DRAWINGS

Further advantages and features of the invention will result from the following description in conjunction with exemplary embodiments of the inventive method and with the aid of Figures. It is shown in.

DESCRIPTION OF PREFERRED EMBODIMENTS

Figure 1:
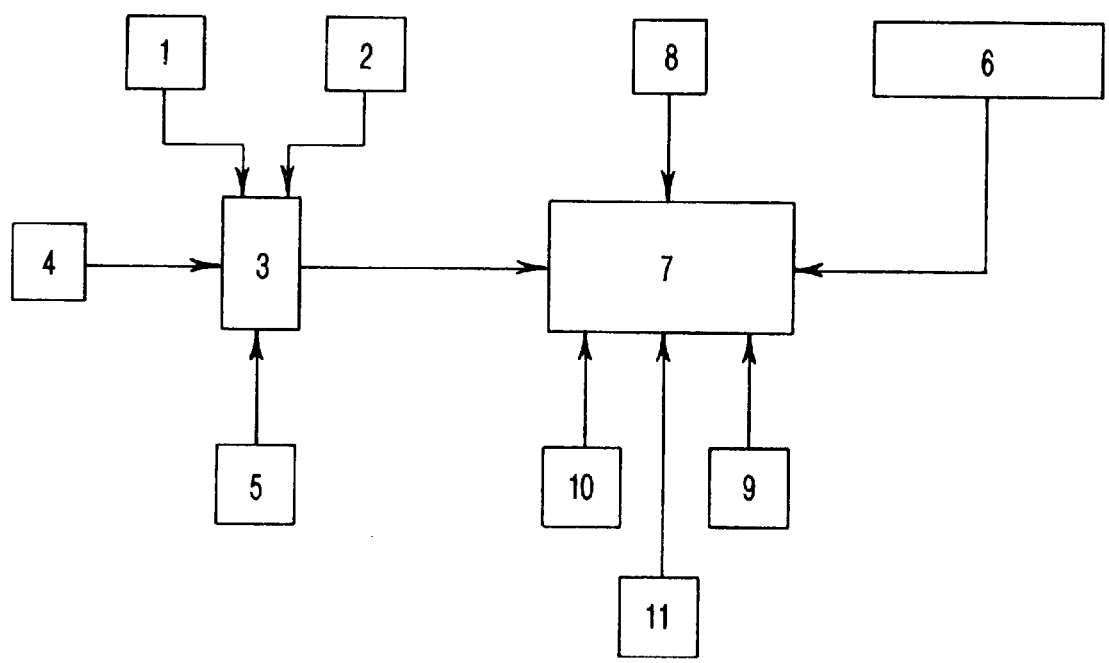
FIG. 1 a schematic flow chart for explaining the method steps.

The embodiments will be explained with the aid of the schematic flow chart represented in FIG. 1.

First, in the steps 1 and 2 the lactams and the required additives are provided in predetermined amounts and are specified. The term specification in this context means the quantitative and qualitative correlation of the individual raw materials to one another which influence a successful performance of the method as a function of the technological know-how. For example, a precise specification may keep the proportions of extractable components of the material, i.e., monomers and oligomers, below 2% so that the technological properties will not be impaired long-term.

In method step 6 the fiber composite material is provided in corresponding amounts, cuts, and specifications. The fiber composite material can be selected depending on the desired technological properties.

For example, fiber glass roving fabrics, textile glass mats, needled glass felt, or needled glass nonwovens can be introduced. When using fiber glass roving fabrics, a homogenous connection between the matrix and fibers must be provided. The connecting points of the glass fiber textile mats can be connected with suitable thermosetting adhesives. The foam-like structures of felts and nonwovens support the significant increase of impact adsorption capability of the material produced.

In method step 3, the lactams and the additives are mixed and melted. A temperature control 4 and a time control 5 provide for generating the desired melt with defined properties and a defined, method-specific behavior.

The fiber composite materials provided in the method step 6 are introduced into the mold 7. A temperature control 8 provides for maintaining the desired temperatures. As a function of the time controls 9 and 10, the introduction of the lactam melt and, as a function of the process control 11, the subsequent polymerization take place.

The process control includes, for example, the closure and evacuation of the mold after completed introduction, the rotation of the mold for producing a spin cast, whereby rpms between 100 and 2000 rpm are provided. The casting occurs at the rotational center. For a rotational cast, for example, a biaxial cast, the rotational speed is adjusted to 30 to 250 rpm. This method allows a batch-wise introduction as a function of the increase of viscosity of the melt in the mold.

After completed polymerization the finished work piece can be easily removed from the mold.

After removal, the desired post-crystallization effects can be produced by storing the workpieces in a defined atmosphere, for example, in a heated or air tight atmosphere.

The mold can be preferably made of stainless steel. Parting agents are not required.

Figure 2:
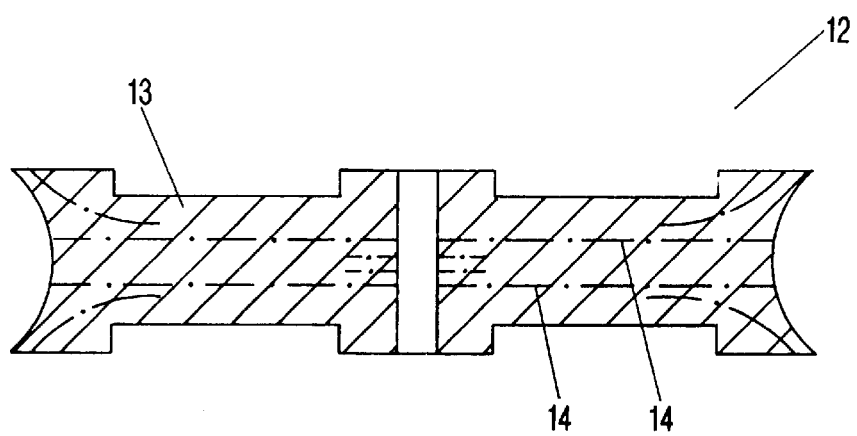
FIG. 2 a schematic cross-sectional view of an embodiment of a molded part.

As is shown in FIG. 2 by example of a cable pulley, by stationarily fixing the fiber composite material within the mold a defined placement of the fiber composite material in the molded part can be effected so that the defined technological properties will result. The finished molded part 12 is comprised of a lactam body 13 in which the fiber composite material, in the shown embodiment fiber mats 14, are embedded in a defined manner.

Figure 3:
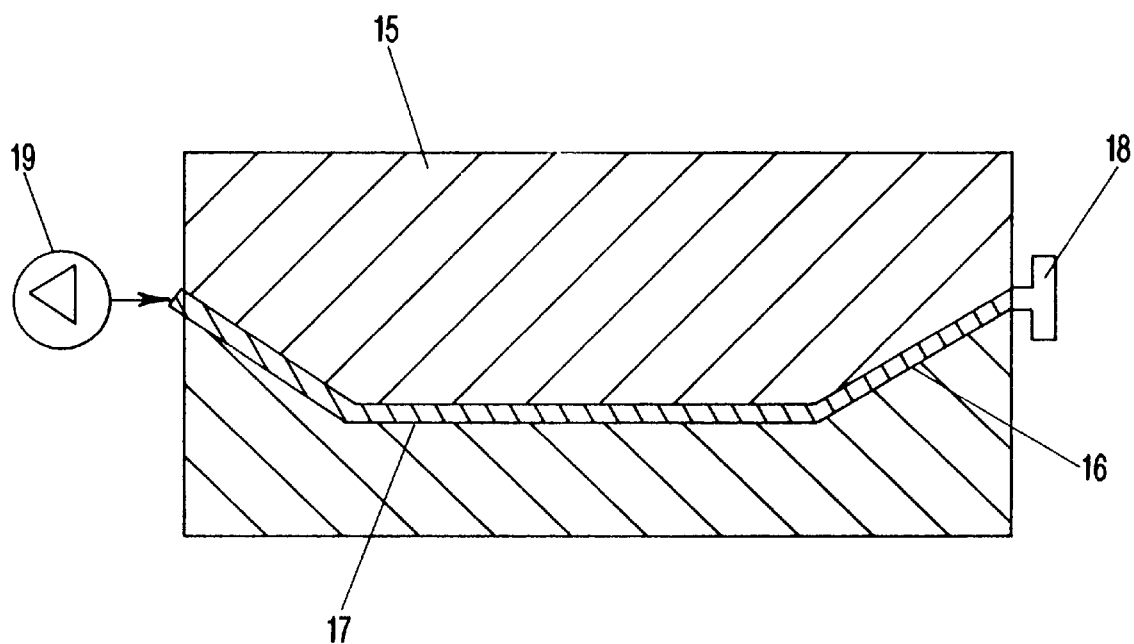
FIG. 3 a schematic representation of an arrangement for performing the method.

The mold 15 represented schematically in FIG. 3 has a cavity 16 for producing a sheet molded part. In the shown embodiment, a fiber composite material 17, for example, a fiber glass fabric is placed into the cavity 16. To the cavity 16 a mixing head 18 is connected so that in the shown embodiment a lactam melt can be introduced by the so-called injection method. Also connected to the cavity 16 is a vacuum pump 19 which produces a vacuum within the cavity 16 so that the melt is sucked via the mixing head 18 into the cavity 16. The fiber composite material placed into the cavity 16 is thus embedded into the melt before polymerization.

The present invention is, of course, in no way restricted to the specific disclosure of the specification and drawings, but also encompasses any modifications within the scope of the appended claims.

What we claim is:

1. A method for manufacturing a sheet molded part by polymerization of lactams in a sheet mold, said method comprising the steps of:

placing a fiber composite material into a sheet mold;

stationarily fixing the fiber composite material in the sheet mold in a defined geometric location;

introducing the lactams into the sheet mold;

polymerizing the lactams to form the sheet molded part having embedded therein the fiber composite material in said defined geometric location.

2. A method according to claim 1, further comprising, before the step of introducing, the step of heating the sheet mold to a temperature of 120° C. to 190° C.

3. A method according to claim 1, further comprising, before the step of introducing, the step of heating the sheet mold to a temperature of 145° C. to 180° C.

4. A method according to claim 1, further comprising, before the step of placing, the step of producing the fiber composite material from fiber glass.

5. A method according to claim 4, wherein a surface of the fiber glass of the fiber composite material is free of ionic substances.

6. A method according to claim 1, further comprising the step of selecting a proportion of fiber glass in the sheet molded part to be 10–70%.

7. A method according to claim 1, further comprising, before the step of placing, the step of producing the fiber composite material from plastic fibers.

8. A method according to claim 1, further comprising, before the step of placing, the step of producing the fiber composite material as a needled felt or needled nonwoven.

9. A method according to claim 1, further comprising, before the step of placing, the step of producing the fiber composite material as rovings.

10. A method according to claim 1, further comprising, before the step of placing, the step of producing the fiber composite material as a woven material.

11. A method according to claim 1, further comprising, before the step of placing, the step of producing the fiber composite material as mats.

12. A method according to claim 1, further comprising, before the step of introducing, the steps of adding additives to the lactams and melting the lactams and additives for forming a melt.

13. A method according to claim 12, wherein in the step of melting the lactams an d the additives are heated to a temperature of 110° C. to 140° C.

14. A method according to claim 12, wherein in the step of melting the lactams an d the additives are heated to a temperature of 116° C. to 125° C.

15. A method according to claim 12, wherein the step of introducing includes pouring the melt into the sheet mold, the method further comprising, after the step of pouring, the step of closing the sheet mold and the step of evacuating the sheet mold.

16. A method according to claim 12, wherein the step of introducing includes pouring the melt in batches into the sheet mold.

17. A method according to claim 1, further comprising, after the step of fixedly positioning, the step of heating the sheet mold.

18. A method according to claim 1, further comprising, after the step of fixedly positioning, the steps of closing the sheet mold and flowing nitrogen through the closed sheet mold.

19. A method according to claim 1, further comprising, before the step of introducing, the step of closing the sheet mold, and wherein the step of introducing includes melting the lactams and injecting the lactams into the closed sheet mold.

20. A method according to claim 1, further comprising the step of pressurizing the closed sheet mold.

21. A method according to claim 1, further comprising, after the step of introducing, the step of rotating the sheet mold.

22. A method according to claim 21, wherein in the step of rotating the sheet mold is rotated at a speed of 30 to 250 rpm.

23. A method according to claim 21, wherein in the step of rotating the sheet mold is rotated at a speed of up to 2000 rpm.

24. A method according to claim 21, further comprising, before the step of introducing, the steps of adding additives to the lactams and melting the lactams and additives for forming a melt, wherein the step of introducing includes pouring the melt into the sheet mold at a center of rotation of the sheet mold.

25. A sheet molded part, comprised of polymerized lactams and a fiber composite material embedded in the polymerized lactams, produced in accordance with the method of claim 1.

26. A sheet molded part according to claim 25, wherein said fiber composite material is fixedly arranged at predetermined locations before being embedded.

* * * * *